T. W. TWYFORD.
FLUSHING VALVE.
APPLICATION FILED JAN. 5, 1912.
1,066,960.
Patented July 8, 1913.
6 SHEETS—SHEET 3.
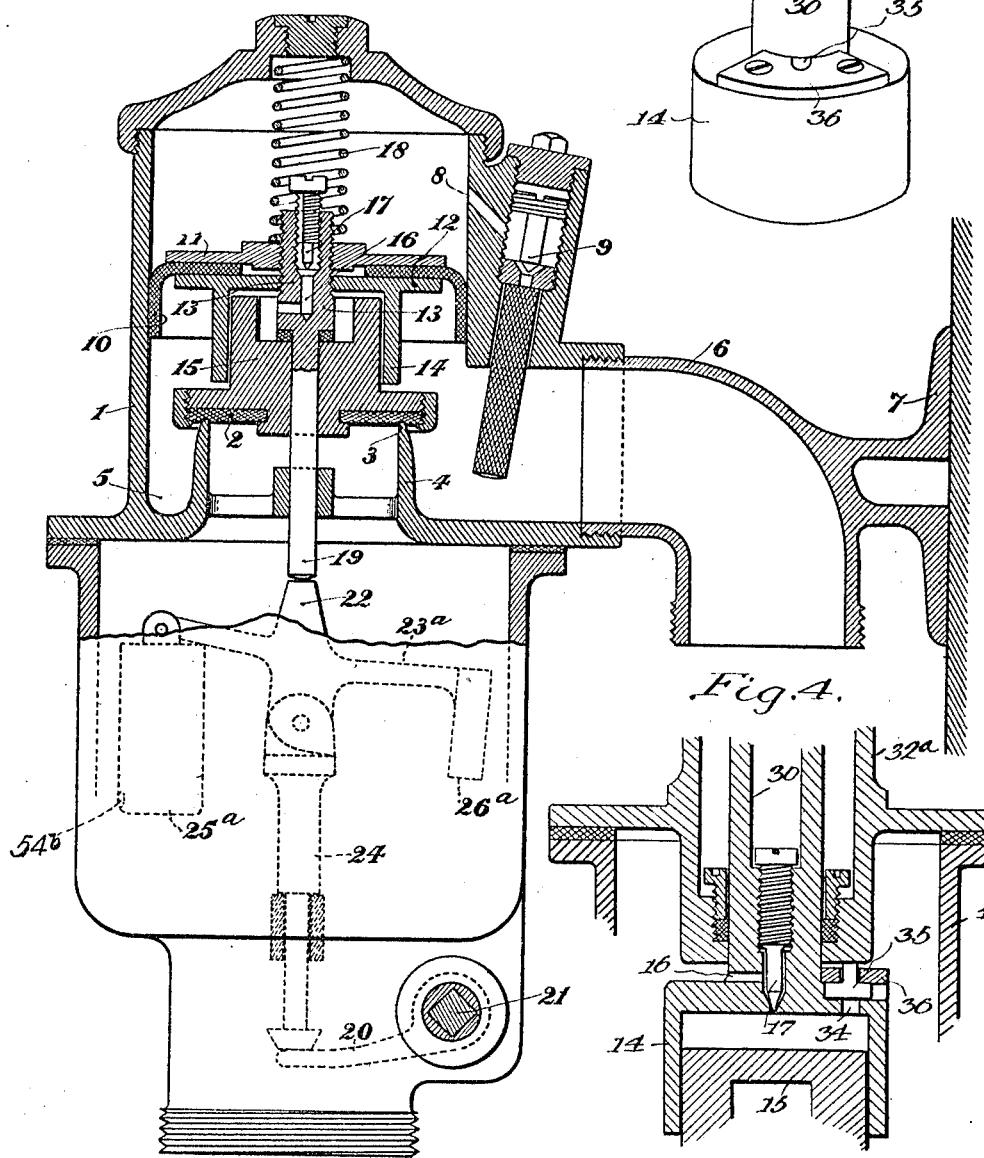
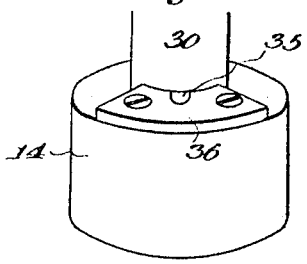
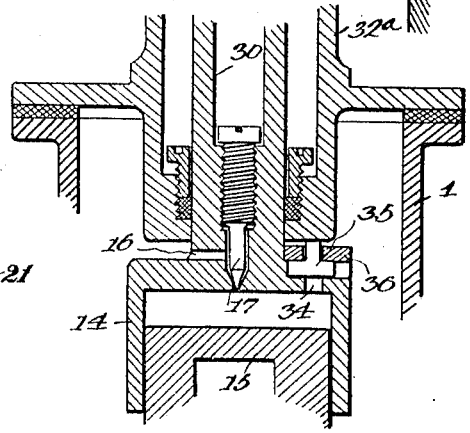
WITNESSES
INVENTOR

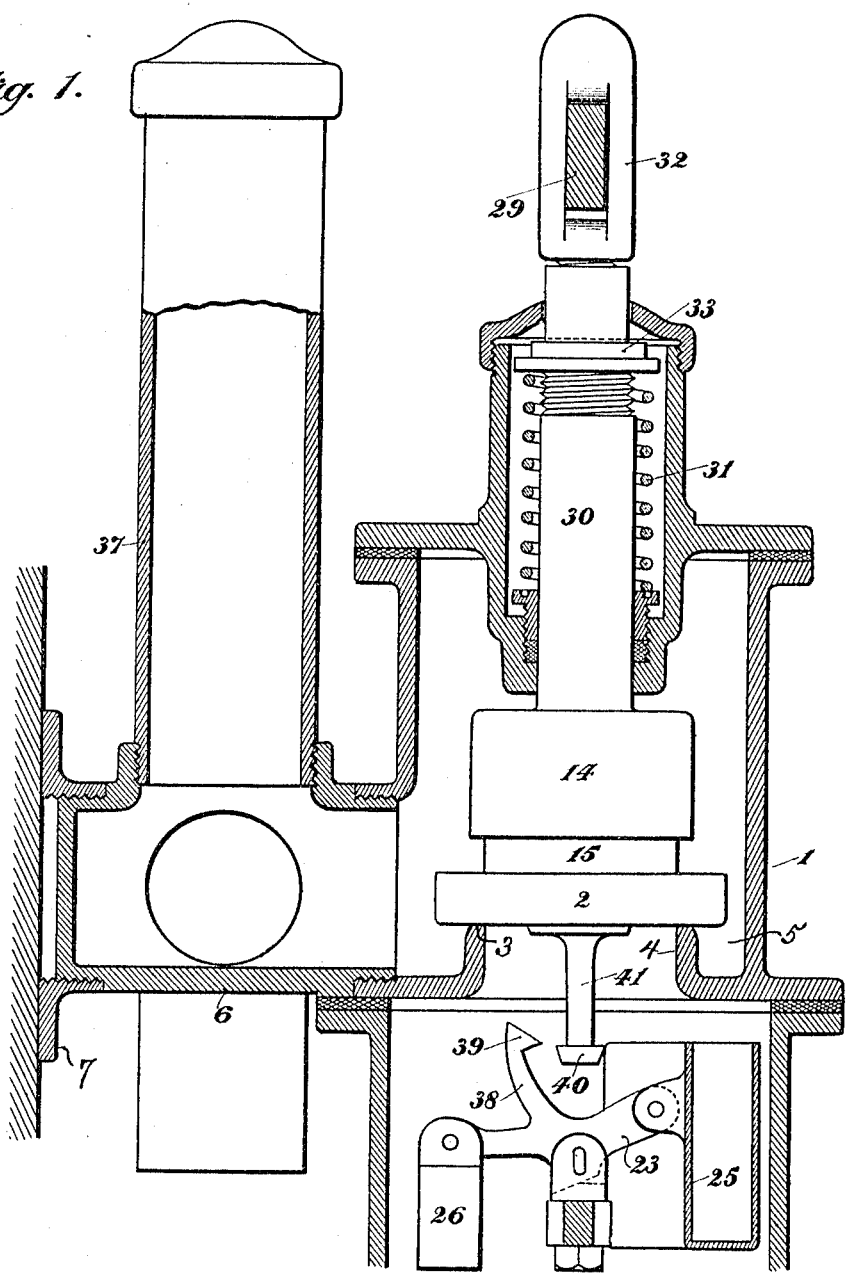

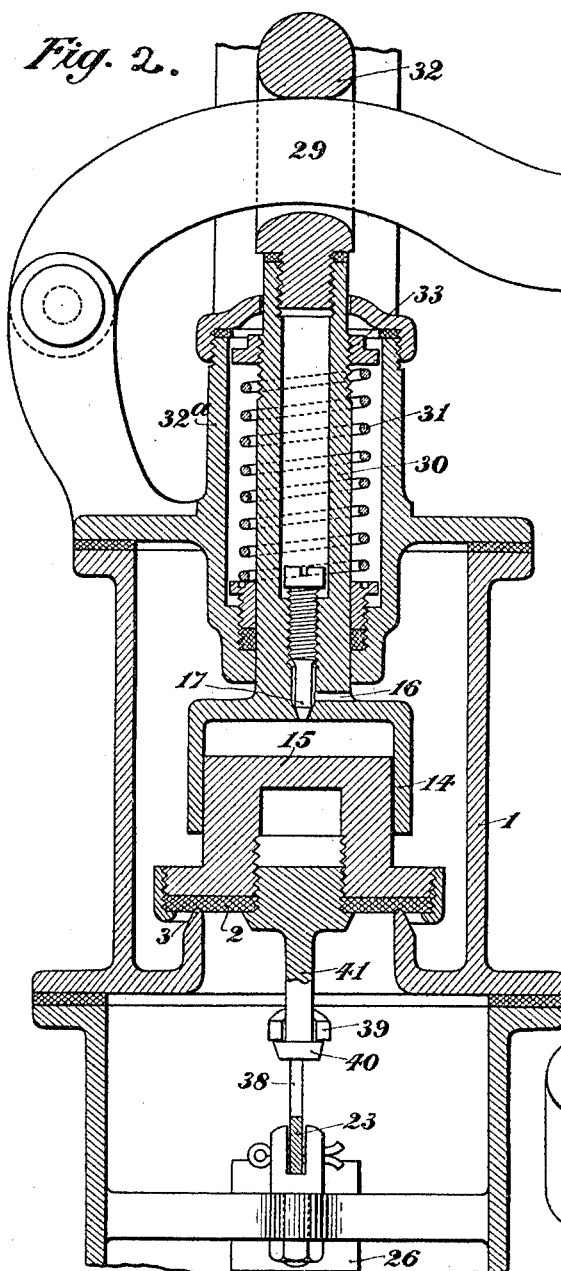
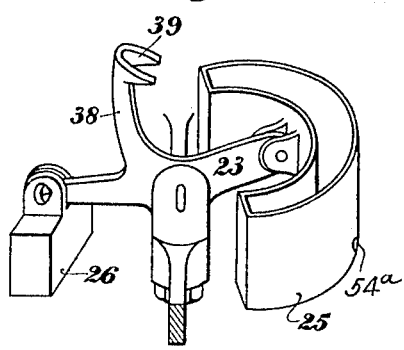
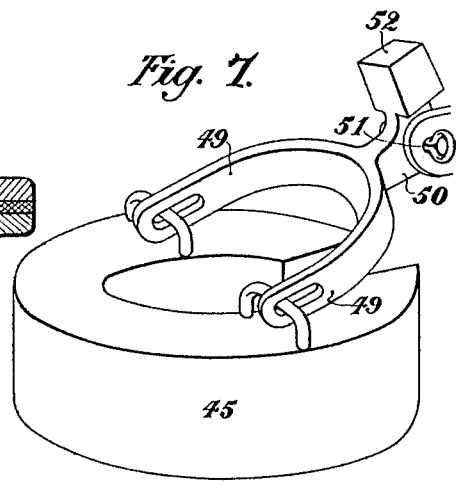

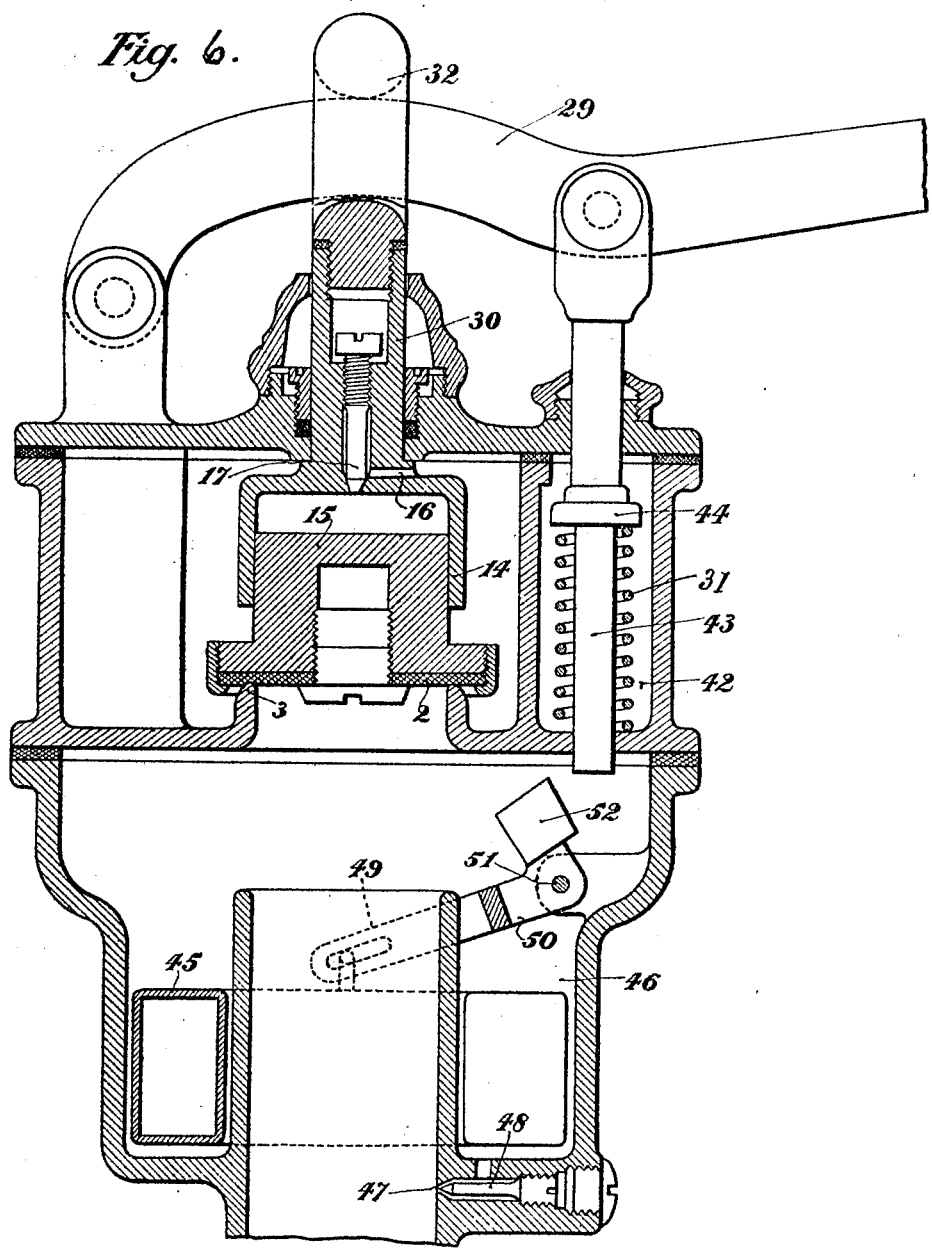

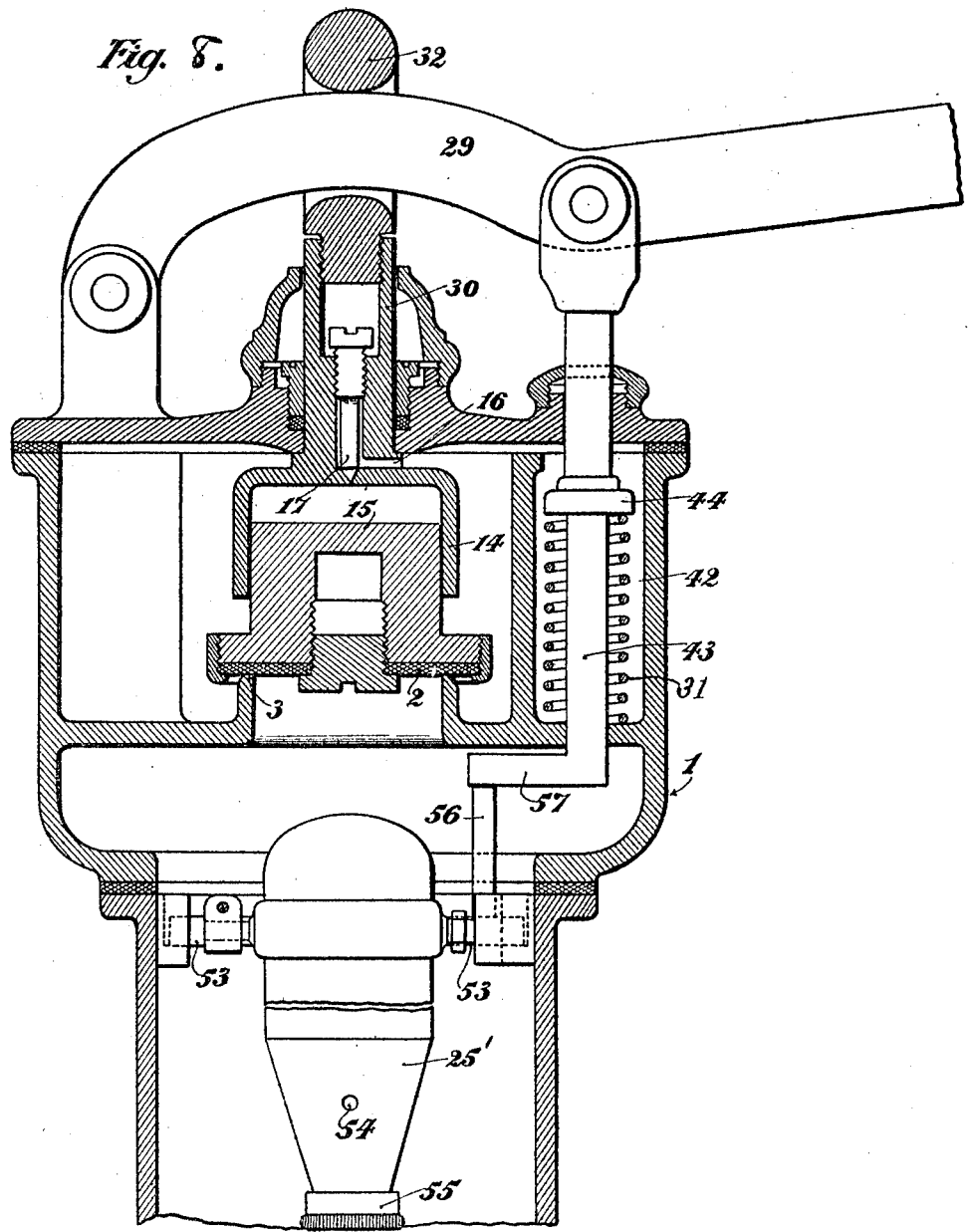

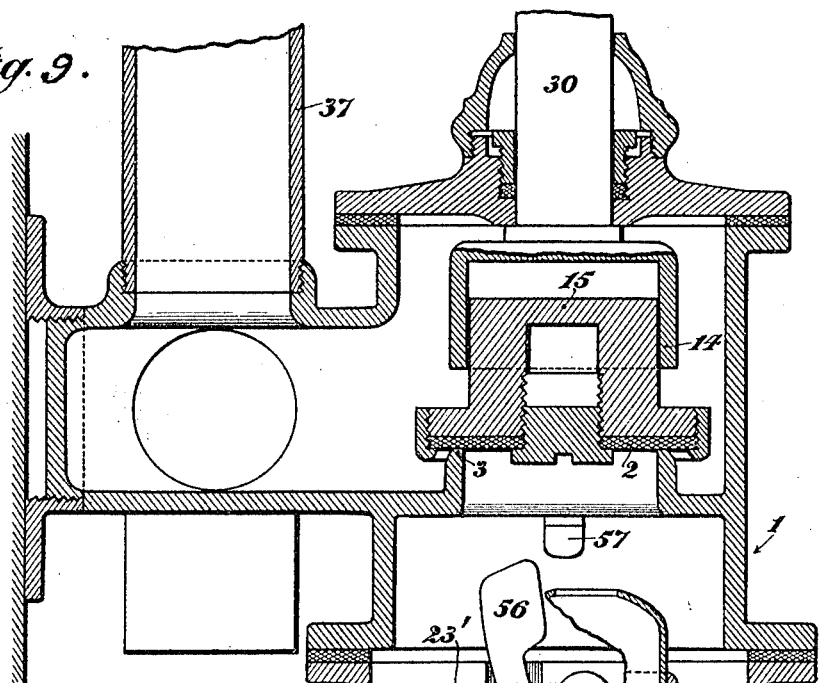
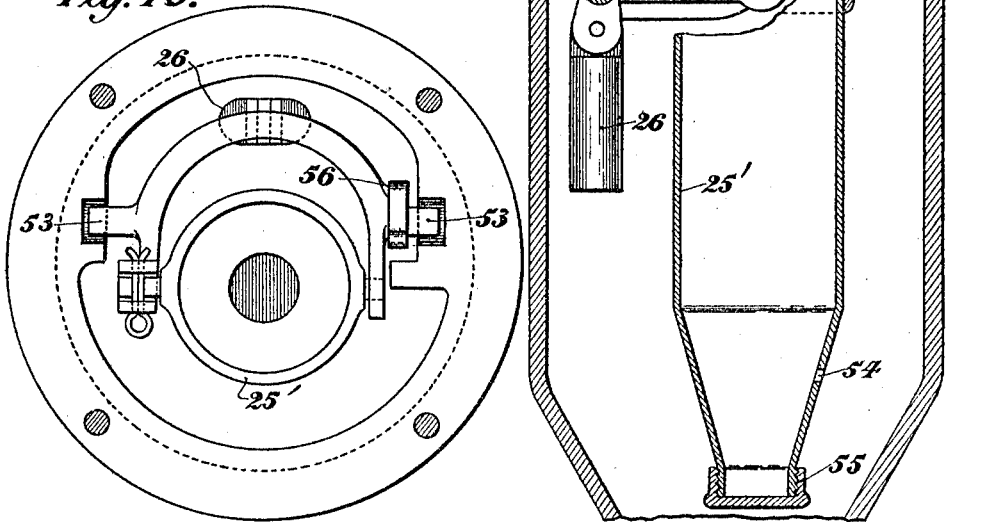

UNITED STATES PATENT OFFICE.

THOMAS WILLIAM TWYFORD, OF HANLEY, ENGLAND.

FLUSHING-VALVE.

1,066,960.　　　　Specification of Letters Patent.　　Patented July 8, 1913.

Application filed January 5, 1912.　Serial No. 669,669.

*To all whom it may concern:*

Be it known that I, THOMAS WILLIAM TWYFORD, subject of the King of Great Britain, residing at Hanley, in the county of Stafford, England, have invented certain new and useful Improvements in Flushing-Valves, of which the following is a specification.

This invention relates to flushing valves or appliances employed in connection with water closets, urinals, slop sinks, and the like, and for other uses, for the purpose of giving a direct flush without the use of a flushing cistern.

The type of apparatus to which the present invention relates comprises a valve which is normally maintained closed by pressure upon its upper side, means for relieving said pressure and causing the valve to rise so as to give the flush, and means (including a passage for admitting water to the upper face of the valve) for positively insuring the flush being interrupted at the end of a predetermined period.

The object of the present invention is to provide an improved construction of flushing valve and to provide improved means for insuring that a certain minimum interval of time must elapse between successive flushes so that when one flush has been obtained the next flush cannot take place until the said interval has expired.

Figure 1 illustrates a flush valve constructed in accordance with this invention; Fig. 2 is a section through the appliance taken at right angles to that shown in Fig. 1. Fig. 3 shows, in perspective, the bucket device separately. Fig. 4 is a section showing the relief valve that is preferably employed; Fig. 5 is an external perspective view of the pressure cylinder, showing the disposition of the relief valve; Fig. 6 represents in section a modification of the last arrangement, and in which a float is employed for insuring the desired minimum interval of time between successive flushes. Fig. 7 shows in perspective the float device separately. Fig. 8 is a section of another arrangement in which a bucket is employed for preventing the appliance from being operated until the expiration of a predetermined interval after the preceding flush. Fig. 9 represents a transverse section through this construction. Fig. 10 is a plan of the bucket device. Fig. 11 is a sectional view of a further modified flushing valve construction in which the features of the invention are incorporated.

The same reference numerals indicate corresponding parts in each of the figures of the drawings.

Referring to Figs. 1, 2, and 3 of the said drawings, the appliance comprises a cylindrical chamber 1 containing the rising and falling valve 2 which normally rests upon a seating 3 at the upper end of a circular wall or outlet passage 4 leading through the body of the appliance to the discharge or flush pipe and forming, with the walls of the lower part of the top chamber 1, an annular space 5 which, at one side, opens into a branch pipe 6 connected to the main supply, and carrying the attachment bracket 7 of the appliance. The valve 2 overhangs the seating 3 so that when closed the pressure of the water acts on the underside of its outer edge and tends to lift it off its seating.

Within a cylindrical housing 14 a piston extension or reduced portion 15 of the valve 2 has a close sliding fit. This housing 14 communicates with the main pressure chamber 1 by means of a passage 16 which is adjustable as regards its effective size, by means of a screw valve 17 so as to vary the rate at which the water can enter the valve chamber.

The housing 14 is carried by a hollow sliding stem 30 provided, at its upper end, with an eye 32 through which the lever handle 29 passes. The stem 30 and housing 14 are normally held in a raised position by a spring 31 contained within a casing 32$^a$ and acting upon a collar 33 upon the said stem. In the crown of the said housing there may be a passage 34 (Fig. 4) controlled by a rubber relief valve 35 retained in place by a screwed-on plate 36 (Figs. 4 and 5). The action of the apparatus is as follows:—Upon depressing the handle 29 the housing 14 descends, and the water contained therein is expelled past the valve 35 and through the passage 16. On releasing the said handle the spring 31 acts upon the stem 30 and lifts the housing 14 into the position shown, causing the valve 2 to rise with it off its seating 3 to give the flush. Water slowly enters the housing 14 through the passage 16, and acts upon the upper face of the piston 15 so as to close the said valve at the end of a predetermined period and interrupt the flush.

The branch inlet pipe 6 (Fig. 1) is preferably provided with an air chamber 37 acting as a cushion or buffer for relieving the parts from shock when the valve is closed. It follows that as the flush takes place only when the handle is released a continuous flush is impossible.

The regulating screw can be readily adjusted through the upper end of the hollow stem 30.

Below the valve 2 is a rocking beam 23 carrying at one end a bucket 25 and at the other end a weight 26. It is also provided with an upward branch 38 having a hook-end 39. Normally the parts take the position shown in Fig. 1, but when the flush takes place the bucket 25 fills and tilts the beam 23 so that when the valve 2 descends the hook 39 engages above an enlargement 40 upon a stem 41 depending from the underside of the said valve, so preventing the latter from being lifted until, by the end of a certain predetermined interval of time, the bucket 25 is emptied by the escape of the water through a small outlet 54ª, (Fig. 3), and the beam assumes its normal position. Instead of a bucket being employed for operating the locking beam, a float may be used, which is situated in a chamber that fills when the flush takes place as in Fig. 6.

Referring to Figs. 6 and 7, in this construction the housing 14, containing the piston extension 15 of the valve 2, is carried, as in Figs. 1 to 3, by a stem 30 having an eye 32 through which passes the lever handle 29. Instead, however, of the spring 31 for raising the valve chamber being arranged around the stem 30, as in the said previously described arrangement, it is separate from the said stem, and is contained within a separate chamber 42. It surrounds a sliding plunger 43 which is jointed to the handle 29, and whose lower end extends into the interior of the body of the appliance. The said spring bears against a collar 44 upon the plunger, so that when the handle is released after having been depressed the spring (acting through the plunger 43) raises the said handle and lifts the stem 30 and housing 14 to admit of the valve 2 rising to give the flush. To insure a minimum interval of time between successive flushes, a float 45 is contained within an annular chamber 46, open at the top, and having a restricted outlet 47 regulated by a screw valve 48. The float 45 is connected at opposite sides (see Fig. 7) to a pair of branches 49 of a rocking beam or lever 50 pivoted at 51 and having an upward extension or block 52. The normal condition of the parts is as shown in Fig. 6. When the flush takes place the chamber 46 fills and the float 45 rises, rocking the lever 50 so as to move the block 52 into vertical alinement with the plunger 43. The lever 29 cannot therefore be depressed until the chamber 46 empties and the float falls, so that the parts resume their normal positions, this taking place at the end of the predetermined time.

The arrangement shown in Figs. 8 to 10 is the same as that shown in Fig. 6 with the exception that a bucket device is employed in lieu of the float for insuring the minimum interval of time between successive flushes. Thus, a lever 23', fulcrumed by trunnions 53, carries at one end the pivotally suspended bucket 25', and at the other end a weight 26. The bucket 25', which is open at the top, has near its lower end a small outlet 54, and at the bottom it is fitted with a detachable screw-cap 55 to allow of the removal of sediment. The lever 23' carries an upwardly extending lug or block 56 which, when the bucket fills when the flush takes place, is swung over into a position beneath the lateral extension 57 of the plunger 43 that is connected with the actuating handle 29, thus preventing the latter from being operated until the water has escaped from the bucket 25' through the outlet 54 at the end of the predetermined lapse of time, and the parts have reassumed their normal position shown in Fig. 9. The bucket may be provided with gauze or other protection at the inlet against the entrance of sediment into the bucket.

The modified flushing valve construction shown in Fig. 11 includes the chamber 1, the rising and falling valve 2 and its seat 3, the annular space 5, and the branch pipe 6, all as above described. Leading from the inlet branch 6 into the upper part of the top chamber is a small passage or by-pass 8 through which the said chamber is filled with water, the pressure of which normally keeps the main valve upon its seat. The said by-pass is provided with a regulating valve 9 so as to vary the quantity of water that passes, and thus the time the chamber takes to fill and the period of the flush.

Contained within the pressure chamber 1 is a plunger 10 consisting of an inverted leather cup washer closely fitting the walls of the chamber and clamped between upper and lower plates 11, 12, screwed on to a central stem 13. The housing 14 in this instance depends from and is formed as a part of the lower member 12 and, as in the previous embodiments, receives the reduced portion 15 of the valve 2 and communicates with the chamber 1 through the passage 16, controlled by the valve 17.

The plunger is acted on by a spring 18 which tends to return the main valve to its seat. The stem 13 is formed with a depending extension 19, passing through an opening in the main valve and adapted to be operated by a lever arm 20, mounted upon a horizontal spindle 21 upon which an external lever handle is fixed.

Assuming the main valve to be closed and the pressure chamber full of water, then, when the operating handle is depressed the plunger 10 is raised against the action of the spring 18, causing the main valve to rise, thus giving the direct flush. The rising of the plunger causes the water in the pressure chamber to be expelled past the edge of the cup washer. The handle being released, the chamber starts to refill, and when the water attains a sufficient pressure the plunger 10, assisted by its spring, descends and takes the valve 2 to its seat, thus interrupting the flush. Should the handle be held depressed and the plunger retained in its raised position, the water entering the pressure chamber through the by-pass, passes through the passage 16 into the valve chamber 14, where it exerts a pressure directly upon the end of the piston extension 15 of the valve, and as soon as this pressure attains a sufficient value (dependent upon the size of the passage 16) the valve will be closed upon its seat, independently of the movement of the plunger. It is thus impossible to hold the valve open after a certain definite period has elapsed. The leather washer also serves the purpose of closing the valve slowly if the handle be released immediately after the flush commences.

In order to insure that a certain predetermined minimum interval of time shall elapse between successive flushes, the lower end of the extension 19 normally rests upon the projecting end 22 of a rocker or beam 23ª, pivotally mounted upon the upper end of a stem 24 adapted to be directly lifted by the lever arm 20 of the operating device. One arm of the beam carries a bucket or vessel 25ª, while the other arm carries a weight 26ª. When the flush takes place this bucket fills with water and falls, thereby actuating the rocker so as to disengage it from the extension 19, so that the extension and valve cannot be operated. The bucket has a small outlet 54ᵇ through which the water slowly escapes and when it has emptied itself, at the end of the predetermined time, the weight 26ª restores the rocker to its original position and reëstablishes the connection between the lever and the extension 19.

Having fully described my invention, what I desire to claim and secure by Letters Patent is:—

1. In a flushing apparatus, in combination, a casing having supply and outlet connections, a valve controlling the outlet connection, opening means for said valve, means for automatically closing the valve after each opening thereof, a normally inoperative device for preventing an opening of said valve by said opening means, and means actuated by the flush for temporarily holding said device in an operative position for a minimum period of time after said flush.

2. In a flushing apparatus, in combination, a casing having supply and outlet connections, a valve controlling the outlet connection, opening means for said valve, means for automatically closing the valve after each opening thereof, a normally inoperative device for preventing an opening of said valve by said opening means, and means actuated by the flush for temporarily holding said device in an operative position for a minimum period of time after said flush, said last-named means including a water accumulating element having a drainage opening through which the water may slowly escape.

3. In a flushing apparatus, in combination, a casing having supply and outlet connections, a valve controlling the outlet connection, opening means for said valve, means for automatically closing the valve after each opening thereof, a normally inoperative device for preventing an opening of said valve by said opening means, and means actuated by the flush for temporarily holding said device in an operative position for a minimum period of time after said flush, said last named means including a bucket in which water may accumulate and which is moved by the accumulation of water therein from its normal position, the bucket having a drainage opening through which the accumulated water may slowly escape.

4. In a flushing apparatus, in combination, a casing having supply and outlet connections, a valve controlling the outlet connection, opening means for said valve, including a depressible handle and a plunger connected thereto, means for automatically closing the valve after each opening thereof, means for preventing an opening of said valve by said opening means for a minimum period of time after the flush and comprising a weighted beam having an extension adapted to engage under said plunger, and an open vessel suspended from said beam and having a small outlet at the bottom thereof, the said vessel filling with water when the flush takes place so as to tilt the beam and move the extension thereof beneath said plunger.

5. In a flushing apparatus, in combination, a casing having supply and outlet connections, a valve controlling the outlet connection, opening means for said valve, means for automatically closing the valve after each opening thereof, a normally inoperative rocking device for preventing an opening of said valve by said opening means, and a device controlled and actuated by the flush, which, when the flush takes place, tilts the rocking device into its operative position.

6. In a flushing apparatus, in combination, a casing having supply and outlet connections, a valve controlling the outlet connection and having opening and closing movements, a manually controlled element operable to effect an opening movement of said valve, and means located beyond the outlet side of the valve for temporarily preventing an opening of said valve by said element, for a minimum period of time after the flush, the means normally occupying, by gravity, an inoperative position and including an element having a restricted water outlet and in which water collects during the flush, the means being so constructed that its movement to operative position is effected by the water which collects in said element.

7. In a flushing apparatus, in combination, a casing having supply and outlet connections, a valve controlling the outlet connection and having opening and closing movements, a manually operated element by which the opening movement of the valve is initiated, and means located beyond the outlet side of the valve for temporarily preventing an opening of said valve by said element for a minimum period of time after the flush, the means comprising a movable element normally occupying, by gravity, a position wherein the opening of the valve may be effected by an operation of said manually operated element and also comprising a water receiving element having a restricted water outlet in which water collects during the flush, the means being so constructed that the movement of its movable element to prevent an operation of the valve by said manually operated element is effected by the water which collects in said water receiving element.

In testimony whereof I have hereunto set my hand in presence of two subscribing witnesses.

THOMAS WILLIAM TWYFORD.

Witnesses:
WILLIAM NOAKE NEWCASTLE,
EDWD. S. CHALLINOR.

---

Copies of this patent may be obtained for five cents each, by addressing the "Commissioner of Patents, Washington, D. C."